US010965976B2

(12) United States Patent
Cramer et al.

(10) Patent No.: US 10,965,976 B2
(45) Date of Patent: Mar. 30, 2021

(54) SYSTEMS AND METHODS FOR DELIVERING RELEVANT MEDIA CONTENT BY INFERRING PAST MEDIA CONTENT CONSUMPTION

(71) Applicant: Spotify AB, Stockholm (SE)

(72) Inventors: Henriette Susanne Martine Cramer, San Francisco, CA (US); Jennifer Thom-Santelli, Boston, MA (US); Neha Kothari, San Francisco, CA (US); Sarah Mennicken, San Francisco, CA (US); Karl Humphreys, London (GB); Bryan Roy, Boston, MA (US)

(73) Assignee: Spotify AB, Stockholm (SE)

( * ) Notice: Subject to any disclaimer, the term of this patent is extended or adjusted under 35 U.S.C. 154(b) by 73 days.

(21) Appl. No.: 16/370,138

(22) Filed: Mar. 29, 2019

(65) Prior Publication Data

US 2020/0314474 A1      Oct. 1, 2020

(51) Int. Cl.
| | |
|---|---|
| *H04N 21/2668* | (2011.01) |
| *H04N 21/239* | (2011.01) |
| *H04N 21/258* | (2011.01) |
| *H04N 21/262* | (2011.01) |
| *H04N 21/422* | (2011.01) |

(52) U.S. Cl.
CPC ..... *H04N 21/2668* (2013.01); *H04N 21/2393* (2013.01); *H04N 21/25891* (2013.01); *H04N 21/26258* (2013.01); *H04N 21/42203* (2013.01)

(58) Field of Classification Search
None
See application file for complete search history.

(56) References Cited

U.S. PATENT DOCUMENTS

| | | | |
|---|---|---|---|
| 2005/0172786 A1 | 8/2005 | Plastina et al. | |
| 2009/0077220 A1* | 3/2009 | Svendsen | H04N 21/4825 709/224 |
| 2009/0187939 A1* | 7/2009 | Lajoie | H04N 21/25883 725/34 |
| 2012/0251082 A1 | 10/2012 | De Vos et al. | |
| 2013/0346187 A1 | 12/2013 | Brodsky | |
| 2014/0067402 A1 | 3/2014 | Kim | |
| 2014/0195919 A1* | 7/2014 | Wieder | H04L 67/306 715/730 |
| 2015/0181289 A1* | 6/2015 | Wheatley | H04N 21/442 725/14 |

(Continued)

FOREIGN PATENT DOCUMENTS

| | | |
|---|---|---|
| EP | 2249303 A1 | 11/2010 |
| WO | 2017/132142 A1 | 8/2017 |

OTHER PUBLICATIONS

Extended European Search Report from corresponding European Appl'n No. 20165268.2, dated Jun. 24, 2020.

*Primary Examiner* — Jason K Lin
(74) *Attorney, Agent, or Firm* — Merchant & Gould P.C.

(57) ABSTRACT

Methods, systems, and related products that provide enhanced personalized media content experiences. Past media content consumption is inferred based on requests for media content selection associated with a time or period of time in the past. The requests are fulfilled by selecting one or more media content items from the inferred media content consumption.

21 Claims, 6 Drawing Sheets

(56) References Cited

U.S. PATENT DOCUMENTS

| | | | |
|---|---|---|---|
| 2015/0242519 A1* | 8/2015 | Alsina | G06F 16/435 707/722 |
| 2017/0161268 A1 | 6/2017 | Badaskar | |
| 2018/0025010 A1* | 1/2018 | Ramer | G06F 16/7867 707/727 |
| 2018/0067946 A1* | 3/2018 | Vaisler | H04N 21/4828 |
| 2018/0293327 A1* | 10/2018 | Miller | G06F 16/26 |

* cited by examiner

SYSTEMS AND METHODS FOR DELIVERING RELEVANT MEDIA CONTENT BY INFERRING PAST MEDIA CONTENT CONSUMPTION

TECHNICAL FIELD

The present disclosure relates to technical solutions for selecting and delivering media content responsive to requests for playback or other selection of media content associated with a specified time in the past.

BACKGROUND

Human-machine interfaces (HMI) that allow human-machine interactions using natural language processing are becoming ubiquitous, in recent times in the form of smart home appliances and mobile devices. Providing a robust HMI involves understanding requests from users and providing relevant responses. A challenge in doing so arises when fulfillment of the request relies on information unavailable to the HMI. In the domain of media content delivery there are technical challenges in providing an HMI that can respond to a request for playback of content, where the request includes temporal boundaries or a particular time. Using words to form requests that describe when the content was previously played (e.g., a particular period in the past) might be made when users cannot recall the specific name of a playlist (or, to a lesser extent, track or artist). That is, users may not recall the particulars of the media content item they want to play again, but they can recall when (or approximately when) they listened to it. In an example, the HMI receives the request: "play what I listened to (or watched) twenty minutes ago" from a user. In response, the HMI accesses a playback log associated with an account of the user and determines which media content items where played for the account in the time period (e.g., twenty minutes prior to the request). However, a technical challenge arises when the request is to play a media content item from a time period for which no playback history exists. For instance, when the HMI receives the query, "play what I listened to (or watched) twenty years ago", but the system does not have playback logs from twenty years ago because the system and/or the user account did not exist at that point.

U.S. Patent Application Publication No. 2017/0161268 relates to methods and systems for searching media with search queries including query terms. An information source is searched to identify parameters associated with a query term. The parameters include at least one of a time parameter, a date parameter, or a geo-code parameter. The parameters are compared to tags of media items to identify matches. Media items whose tags match the parameter are presented to the user.

SUMMARY

In general terms, the present disclosure provides systems, methods, and computer readable products that, in response to a request for media content playback or other forms of media content selecting (e.g., presenting titles items, marking items as favorites, holding items for future playback, etc.), infer past media content consumption and select for playback or other selection from the inferred past consumed media content, one or more media content items that is/are relevant to the request. In examples, the request for media content selection includes a command or intent (e.g., "play," "find," "list,") and a description of what is desired to be selected, i.e., a target of the intent. The target includes an historical playback component (e.g., "what I listened to," "something I watched," etc.) and an additional temporal limitation (e.g., "twenty years ago," "in college," "in my childhood," "when I was a teenager," etc.).

According to certain aspects of the present disclosure, a non-transitory computer-readable medium is provided having stored thereon instructions that, when executed by one or more processors, cause the one or more processors to: receive a request for playback or other selecting of one or more media content items previously played, the request including a temporal limitation, the request being associated with an account; access a playback log of the account; determine whether the playback log includes one or more entries having timestamps that meet the temporal limitation; responsive to the playback log having one or more timestamps that meet the temporal limitation: identify one or more first media content items from the playback log based on the temporal limitation; and initiate playback of, or perform another selecting action on, the one or more identified first media content items; and responsive to the playback log not having one or more timestamps that meet the temporal limitation: access a taste profile of the account; identify a plurality of second media content items based on the temporal limitation; curate the plurality of identified second media content items using the taste profile to form a curated list of one or more second media content items; and initiate playback of, or perform another selecting action on, a second media content item from the curated list.

In some examples, the another selecting action on the one or more identified first media content items and/or the another selecting action on the second media content item includes: presenting a title of the first or second media content item(s), or marking the first or second media content item(s) as favorite(s), or holding the first or second media content item(s) for future playback.

In some examples, the non-transitory computer-readable medium has stored thereon further instructions that, when executed by the one or more processors, cause the one or more processors to parse the received request into a historical playback component and the temporal limitation.

In some examples, the non-transitory computer-readable medium has stored thereon further instructions that cause the one or more processors to: infer a range of time from the temporal limitation; and identify the one or more second media content items based on the inferred range of time.

In some examples, the curate includes one or more of: applying artist and/or album limitations; applying a crowding limitation; removing one or more spam media content items; removing one or more karaoke media content items; removing one or more white noise tracks; removing one or more explicit media content items; collapsing two or more media content item versions; and/or sorting two or more media content items based on affinity.

According to further aspects of the present disclosure, a method comprises: receiving a playback or other selecting request associated with an account, the playback or other selecting request including a temporal limitation; determining a nostalgia level of the playback or other selecting request based on the temporal limitation; responsive to determining that the nostalgia level satisfies a recent-nostalgia threshold: identifying a first media content item to play or perform another selecting action on using a recent playback log; and initiating playback of, or performing another selecting action on, the identified first media content item; and responsive to determining that the nostalgia level satisfies a distant-nostalgia threshold: identifying a cohort based on demographic information associated with the account; determining a cohort set of second media content items meeting the temporal limitation and having at least a high playback rate among members of the cohort; curating the cohort set based on a taste profile of the account to form a curated set of the second media content items; and initiating playback of, or performing another selecting action on, a second media content item from the curated set.

In some examples, the method further includes inferring a range of time from the temporal limitation; and wherein the determining the cohort set of second media content items is based on the inferred range of time.

In some examples, the identifying the cohort is also based on one or more nostalgia metrics associated with the account. Nostalgia metrics are described in U.S. patent application Ser. No. 15/663,586 filed on Jul. 28, 2017, the contents of which application are hereby fully incorporated by reference.

It can be appreciated that the systems, methods, and computer readable products of the present disclosure serve a variety of technical advantages and improvements over existing technologies and, particularly, over existing computer technologies directed to media content playback via human-machine interfaces. For example, aspects of the methods, systems, and computer readable products of the present disclosure serve the technical advantage of improving how a machine infers personal historical media consumption tendencies without access to any personal playback records from the historical time period in question, and thereby recreating a personalized past media content consumption experience without a record that such a past experience actually occurred.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers unless otherwise indicated.

DETAILED DESCRIPTION

Figure 1:
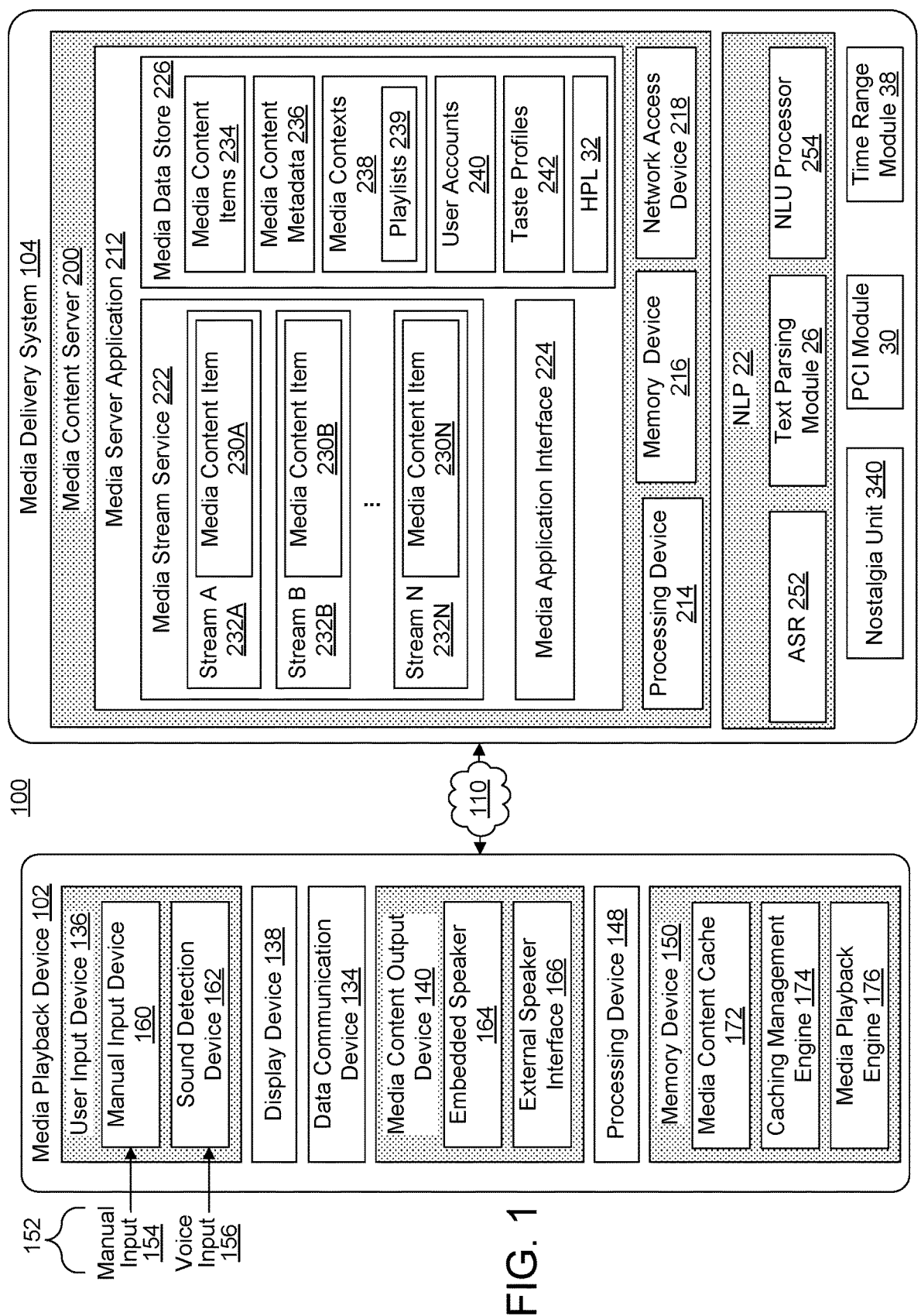
FIG. 1 schematically illustrates components of an example embodiment of a system in accordance with the present disclosure.

The example embodiments presented herein are directed to systems, methods, and non-transitory computer-readable medium products that enhance machines' abilities to infer personal past media content consumption via a human machine interface (HMI). The example embodiments described are for convenience only, and are not intended to limit the application of the present invention. After reading the following description, it will be apparent to one skilled in the relevant art how to implement the following disclosure in alternative embodiments.

In an example technical solution, the present disclosure provides a system that infers what would have been in the playback log at a specified time based in part on a taste profile (described in more detail below) of an account. For instance, an HMI of a system receives a request associated with an account. The request is for playback of a media content item previously played at a specified time in the past, the past time corresponding to a temporal limitation of the request. The system accesses a playback log of the account and determines whether the playback log extends sufficiently back in time to the specified time (e.g., the playback log includes entries having timestamps near the specified time). If the playback log extends to the specified time, the temporal limitation is met and a media content item logged as having previously been played during that specified time is selected from the playback log and played. If the playback log does not extend to the specified time (i.e., the temporal limitation is not met by at least one time stamp in the playback log), the system accesses a taste profile of the account and selects media content items from the specified time period that would have been played based in part on the taste profile.

For instance, selecting the media content items can include determining a plurality of media content items that were popular at the specified time or media content items that are popular now that were released near the specified time. The plurality of media content items are then curated using the taste profile to form a curated playlist. In turn, playback of a media content item from the curated playlist is initiated. It should be understood that the temporal limitation portion of the request need not be precise. The requested time can be approximate. Thus, instead of searching the playback log for a specified time, the time can be a range of specified times.

Although primarily described in the domain of music, techniques herein are applicable to other kinds of media content, such as other audio content (e.g., audiobooks or podcasts), video content (e.g., shows or movies), game content (e.g., video games), and virtual reality content, among other content. Similarly, it should be appreciated that principles of the present disclosure can be applied outside of media content management altogether, and can be generally applied to improve fulfillment of any form of utterance-based request placed via a human machine interface of a system that processes vocalized natural language.

A media content item is an item of media content, such as an audio content item, a video content item, or other types of media content, which may be stored in any format suitable for storing media content. Non-limiting examples of media content items include songs, albums, audiobooks, music videos, movies, television episodes, podcasts, other types of audio or video content, and portions or combinations thereof.

Device Environment

FIG. 1 is a block diagram of an example media content provision system 100 including a media playback device 102 and a media delivery system 104. In this example, media playback device 102 includes a user input device 136, a display device 138, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems. It should be understood that for simplicity FIG. 1 illustrates only one media playback device 102. However, it is envisioned that multiple media playback devices 102 are in use in system 100.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio.

In some embodiments, the media playback device 102 is a system dedicated for streaming personalized media content in a vehicle environment.

The user input device 136 operates to receive a user input 152 for controlling the media playback device 102. As illustrated, the user input 152 can include a manual input 154 and a voice input 156. In some embodiments, the user input device 136 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of a user query. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query received from the sound detection device 162 of the media playback device 102. In addition, the voice input 156 is a user's voice for managing various data transmitted via the media playback device 102 and/or controlling other functions or aspects associated with the media playback device 102.

Media playback device 102 can detect the various actions taken in connection with the media content. For example, music playback applications include functions such as rewind, forward, pause, stop, and skip.

Referring still to FIG. 1, the display device 138 operates to display information. Examples of such information include media content playback information, notifications, and other information. In some embodiments, the display device 138 is configured as a touch sensitive display and includes the manual input device 160 of the user input device 136 for receiving the manual input 154 from a selector (e.g., a finger, stylus etc.) controlled by a user. In some embodiments, therefore, the display device 138 operates as both a display device and a user input device. The display device 138 operates to detect inputs based on one or both of touches and near-touches. In some embodiments, the display device 138 displays a graphical user interface for interacting with the media playback device 102. Other embodiments of the display device 138 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 104 and receive media content from the media delivery system 104 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that media output is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, includes one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BlueRay discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, and a media playback engine 176.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

In some examples, media content is identifiable through the use of a media content item identifier. Media content is thus retrievable for playback via the use of a media content item identifier. Other media content playback retrieval mechanisms now known or future developed can be used. Individual media content can be referred to as a media object, media content item, or multimedia object. Examples of media content include, songs, albums, music videos, podcasts, audiobooks, movies, radio stations, TV stations, TV shows, books, video games and the like. One or more media content item identifiers can be grouped together to form a media content context, such as a playlist, album, search result list, or season, among others.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

Referring still to FIG. 1, media delivery system 104 includes a media content server 200 and a natural language processing subsystem (NLP) 22. The media delivery system 104 includes one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200 and NLP 22 are provided by separate computing devices. In other embodiments, the media content server 200 and the NLP 22 are provided by the same computing device(s). Further, in some embodiments, at least one of the media content server 200 and the NLP 22 is provided by multiple computing devices. For example, the media content server 200 and the NLP 22 may be provided by multiple redundant servers located in multiple geographic locations.

Although FIG. 1 shows a single media content server 200, and a single NLP 22, some embodiments include multiple media content servers and behavior analyzer servers. In these embodiments, each of the multiple media content servers and behavior analyzer servers may be identical or similar to the media content server 200 and the NLP 22, respectively, as described herein, and may provide similar functionality with, for example, greater capacity and redundancy and/or services from multiple geographic locations. Alternatively, in these embodiments, some of the multiple media content servers and/or the behavior analyzer servers may perform specialized functions to provide specialized services. Various combinations thereof are possible as well.

The NLP 22 includes an automatic speech recognizer (ASR) 252, a natural language understanding (NLU) processor 254, a and a text parsing module 26.

The text parsing module 26 includes natural language understanding (NLU) capabilities, and is adapted to parse text generated by the ASR 252 and/or the NLU processor 254 into different components. In general, the text parsing module 26 identifies requests associated with selection of media content items. The media content selection request is, for example, a request for playback of one or more media content items, a request to list (audibly or as text) the titles or other identifying information of one or media content items, a request to save a playlist of one or more media content items for future playback, a request to suggest an appropriate media content item for playback, and so forth.

In a more specific example, the text parsing module 26 identifies, within a string of text provided by the ASR 252 and/or the NLU processor 254 and corresponding to a media content selection request associated with an account, an historical playback component of the request and a temporal limitation that modifies the request. That is, the text parsing module 26 identifies a selection intent (e.g., playback) and a target of the request (e.g., one or more historically played media content items) and a temporal limitation that modifies the target (e.g., from 20 years ago).

It should be appreciated that, in some alternative examples, the request for selection of historically consumed media content items can be input to the system 100 as text (e.g., via the manual input device 160) rather than as speech. For requests input as text, one or both the ASR 252 and NLU processor 254 may not be needed in order to properly parse the request with the text parsing module 26.

Each of the ASR 252, the NLU processor 254, and the text parsing module 26 is adapted to receive input and provide output as described above and in more detail below. It should be appreciated that the various components of the NLP 22 can be, but need not be, stored on the same storage device.

The media content server 200 transmits stream media to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 110. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items 230 from the media content server 200. For example, the media application interface 224 receives communication from the media playback device 102 to receive media content from the media content server 200.

In some embodiments, the media data store 226 stores media content items 234, media content metadata 236, media contexts 238, user accounts 240, taste profiles 242, and historical playback logs (HPL) 32. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 1, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

The media delivery system 104 also includes a nostalgia unit 340, a past consumption inferring (PCI) module 30, and a time range module 38. Briefly, the past consumption inferring (PCI) module 30 (discussed in more detail below) is able to select, through inference, one or more candidate media content items to fulfill a request made via the account for selection of media content that predates the historical playback log HPL 32. The PCI module 30, the time range module 38, and the nostalgia unit 340 will be described in greater detail below.

Example Implementations

In operation of the system 100, a request is received via the media playback device 102 for the selection of one or more media content items previously consumed by a user of an account 240, e.g., music tracks previously listened to by the account user. For example, the request is made by natural speech that is received by the sound detection device 162 and converted into text with the ASR 252. Automated speech recognition can be performed by the ASR 252 using any of a variety of techniques (e.g., based on Hidden Markov Models, Dynamic time warping (DTW), neural networks, and the like). Examples of automated speech recognition systems include CMU SPHINX, maintained by CARNEGIE MELLON UNIVERSITY, and DEEPSPEECH, maintained by the MOZILLA FOUNDATION.

The converted text is passed to the NLU processor 254 and the text parsing module 26. The text parsing module 26 which parses the text. In particular, the text parsing module 26 understands the request as one for selection of previously consumed content associated with the account, identifies the type of selection intended, and also identifies a temporal limitation in the request. This function can be performed instead by or, conjointly with, the NLU processors 254.

The media delivery system 104 compares the parsed temporal limitation to the current date, i.e., the date the request is made, and queries the historical playback log 32 to determine if there are historical records in the playback log 32 that meet the temporal limitation and corresponding to the account 240 making the request.

The time range module 38 uses one or more rules to attach a range of time to the temporal limitation. An example rule used by the time range module 38 is a units rule that determines a unit of time (e.g., days, months, years, decades) to use for the calculated range of time. Another example rule used by the time range module 38 is a range limit rule that precisely sets the beginning and end of the calculated range of time, e.g., to a specific minute of a specific day (e.g., 12:01 AM on Jan. 1, 1988). Another example rule used by the time range module 38 is a magnitude rule, which determines the duration (e.g., 3 months, 10 years) of the calculated range of time. In some examples, the magnitude rule determines the duration in part based on how far back in time temporal limitation is. For example, the farther back in time is the temporal limitation, the greater the duration of the range of time that is set by the time range module 38.

The media delivery system 104 then queries the historical playback log 32 to determine if there are any playback records from within the range of time provided by the time range module 38.

For example, to the temporal limitation "20 years ago" the time range module 38 attaches a time range of any date in a range from 17 years to 23 years before the current date.

The time range module 38 is also configured to assign an actual time range to a temporal limitation that is not provided in units of time. For example, for the temporal limitation "when I was in high school" the time range module infers a set of years when a person associated with the account was in high school by retrieving information (e.g., the user's current age) from the user account 240 (which may include, e.g., the user's date of birth) and calculating an appropriate time range to attach to the temporal limitation (e.g., a time range from September 1993 through June 1997) or, to be more inclusive and precise as dictated by the rules of the time range module 38, a time range from Jan. 1, 1993 through Dec. 31, 1997, or Jan. 1, 1992 through Dec. 31, 1998, etc.

The media delivery system 104 determines whether the historical playback log 32 includes any playbacks with timestamps that meet the temporal limitation of the request being processed, e.g., timestamps from within the time range determined by the time range module 38. If one or more timestamps in the historical playback log 32 meet the temporal limitation, the corresponding one or more media content items are selected to fulfill the request. For example, if the intent and target of the request was to playback media content items, the corresponding media files are retrieved from the media data store 226 and provided to the media playback device 102 for playback. In some examples, only a subset of the media content items that meet the temporal limitation are selected, e.g., the M media content items with the most timestamps that meet the temporal limitation, where M is a positive integer.

If no timestamps in the historical playback log 32 meet the temporal limitation, in some examples it is determined if one or more timestamps in the historical playback log 32 predate the temporal limitation. For example, if a time range of the years 2005 through 2006 is attached to the temporal limitation and no historical time stamps are found within the time range, it is next determined if there are any timestamps that predate 2005. In some examples, if there are one or more timestamps that predate the temporal limitation, the time range module 38 applies one or more rules to expand the attached time range to encompass at least one historical time stamp. In some examples, the time range is expanded only backwards in time. In some examples, the time range is expanded only forwards in time. In some examples, the time range is expanded both forwards and backwards in time. In some examples, the amount of time expansion backwards and/or forwards corresponds to the amount of time between the temporal limitation and the most recent time stamp in the historical playback log 32 that predates the temporal limitation.

If no timestamps in the historical playback log 32 meet the temporal limitation as defined by the time range module 38, and it is determined that no timestamps in the historical playback log 32 predate the temporal limitation, the PCI module 30 infers one or more inferred media content items that the account user would have consumed in the attached time range. To infer the one or more inferred media content items, in some examples, the PCI module 30 infers a first group of inferred media content items. For example, the PCI module 30 consults media content metadata 236 to identify media content items that were popular during the time range attached to the temporal limitation, or media content items that are popular now that were released during or approximately during the time range attached to the temporal limitation. For example, the first group of inferred media content items consists of the N media content items which, according to media content metadata available in the media content metadata 236, had the most weekly number 1 national rankings during the attached time range, where N is a positive integer either predefined by the system 100, or generated as a function of one or more variables, such as the time range attached to the temporal limitation, a number of media content items requested for selection (e.g., "play the song I listened to the most in high school" versus "play my twenty favorite songs in high school"), and so forth.

In some examples, the first group of inferred media content items is then curated to generate a second group, or a curated group or set of inferred media content items. For example, the first group of media content items are curated using a taste profile 242 associated with the logged in account 240. The curated group of inferred media content items is a subset of the first group of inferred media content items, where one or more media content items from the first group of inferred media content items have been eliminated based on the taste profile 242. For example, in the case of music media content, if the taste profile 242 indicates a lack of affinity for country music, all of the country music tracks from the first group of inferred media content items are eliminated in generating the curated group of inferred media content items. In some examples, once the curated group is generated, at least one media content item from the curated group is then selected (e.g., to playback, form a playlist, etc.) to fulfill the original request for media content selection.

Based on the taste profile 242 and/or other preset attributes, the curating can include: applying artist and/or album limitations; applying a crowding limitation; removing one or more spam media content items; removing one or more karaoke media content items; removing one or more white noise tracks; removing one or more explicit media content items; collapsing two or more media content item versions; and sorting two or more media content items based on affinity.

In addition to defining a subset of the first group of inferred media content items, the curating can also involve sorting (e.g., generating an order of media content items in a playlist) of the inferred media content items using attributes of the taste profile 242, or other attributes as described above. Thus, the curating can be used to generate an overall higher quality media content playback experience with a plurality of media content items.

It should be appreciated that multiple parameters, both including and in addition to a taste profile, can be used by the PCI module 30 to curate the first group of inferred media content items. For example, playback recency is one example of such a variable that can be used, in addition to taste profile information, to curate the first group of inferred media content items. Recency means how recently a particular media content item was played back on an account, and the PCI module 30, in generating the curated group of inferred media content items, eliminates from the first group of inferred media content items (and by consulting the historical playback log 32), e.g., the P most recently played back media content items, where P is a positive integer, or any media content items that have been played back within a past predetermined amount of time T, e.g., within the past week prior to the media content selection request.

Figure 2:
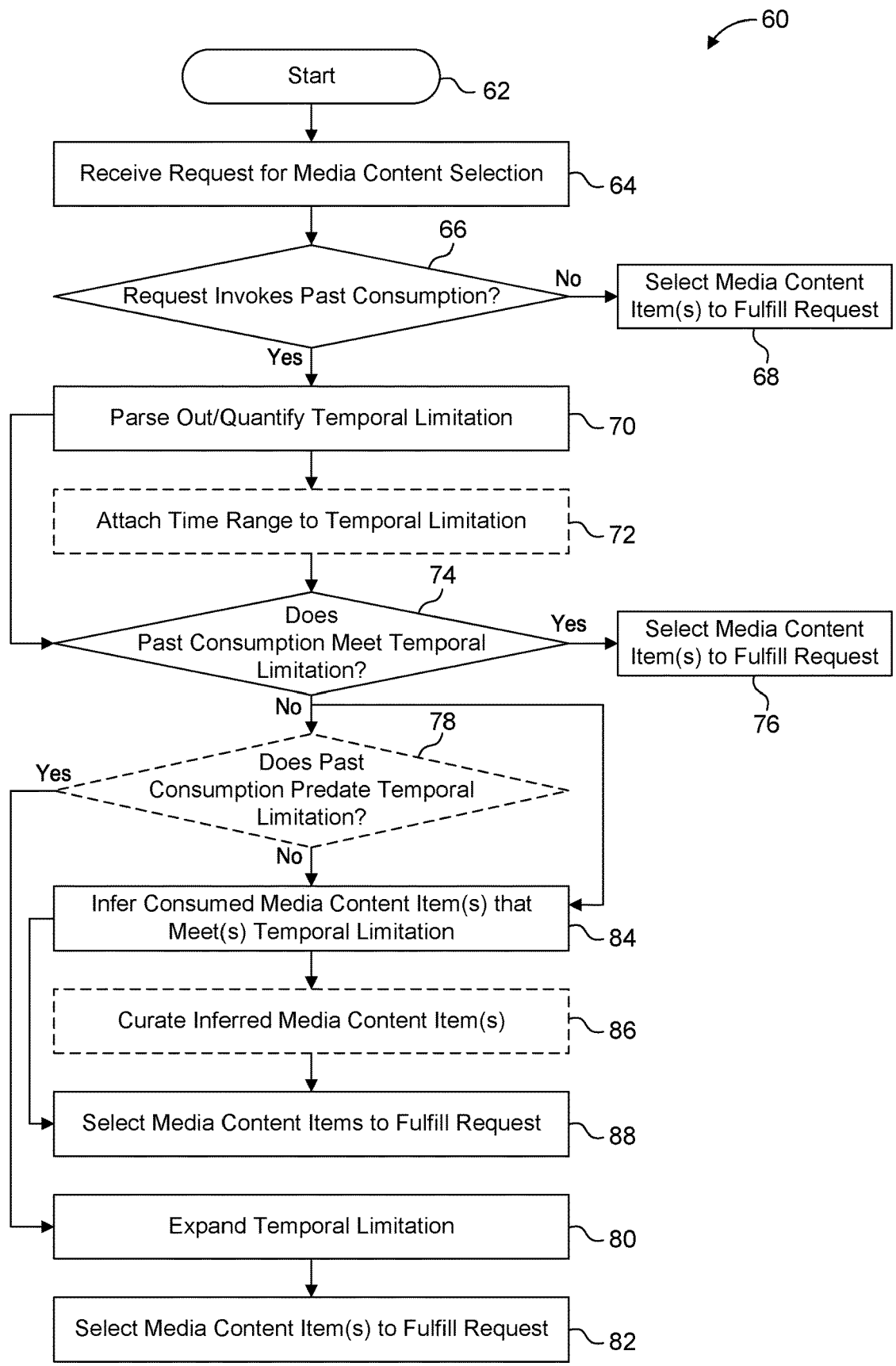
FIG. 2 depicts an example process flow according to an embodiment of the present invention.

FIG. 2 depicts an example process flow 60 according to an example embodiment of the present invention. In some examples, the process flow 60 is performed by system 100 of FIG. 1.

Referring to FIG. 2, the process flow begins, e.g., with an account login, at the start 62.

In an operation 64, a request associated with the account for media content selection is received.

In an operation 66, a determination is made whether the received request invokes a past media content consumption event, e.g., requests selection of media content that was previously consumed by a user of the account.

If a determination is made in operation 66 that no such invocation in the request, in an operation 68 the system selects one or more media content items to fulfill the request. If a determination is made in operation 66 that an invocation in the request exists, in an operation 70 the request is parsed to identify a temporal limitation in the request, e.g., ("from my college years") and quantify the temporal limitation (e.g., September 2001 through June 2005).

In an optional operation 72, a time range is attached to the parsed out and quantified temporal limitation.

From the operation 70 or from the operation 72 the process flow continues to an operation 74 where a determination is made e.g., by consulting an historical playback log, if there is any past media content consumption associated with the account that meets the temporal limitation, or the temporal limitation as adjusted by the operation 72.

If such past media content consumption is located, in an operation 76 one or more media content items is selected from those located to fulfill the request. If such past media content consumption is not located, in an operation 78, a determination is made, e.g., by consulting the historical playback log, if there is any past media content consumption associated with the account that predates the temporal limitation or the temporal limitation as adjusted at the operation 72.

If such predating media content consumption is located, in an operation 80, the temporal limitation is expanded to a range that includes at least one media content item consumed within the expanded temporal limitation, and in a follow on operation 82, at least one such media content item is selected to fulfill the request. If no such predating media content consumption is located, then in an operation 84 (which optionally follows directly from the operation 74), an inference is made as to one or more media content consumption associated with the account. The inferred consumption meets the temporal limitation provided at the operation 70. Alternatively, the inferred consumption meets the adjusted temporal limitation provided at the operation 72. The inferred media content consumption includes a first group of inferred media content items.

In an optional operation 86, the first group of inferred media content items is curated, e.g., using a taste profile, to provide a second group of inferred media content items. The second group of inferred media content items is a subset of the first group of inferred media content items. In a follow-on operation 88, which optionally follows directly from the operation 84, one or more media content items from the second group of inferred media content items (or from the first group of media content items if the operation 86 is skipped) is selected to fulfill the request, e.g., selected for playback on a user device.

Referring again to FIG. 1, a further technical solution in accordance with the present disclosure and using the system 100 will now be described.

The further technical solution includes systems, methods, and computer readable products that allow an HMI to better fulfill a request for selection of media content items from a specified time period by determining a nostalgia level associated with the request. In some examples, the nostalgia level classifies where a request lies on a spectrum between recent nostalgia and distant nostalgia. As used herein, "recent nostalgia" refers to a desire for something (e.g., playback of a music track) from the recent past. As used herein, "distant nostalgia" refers to a desire for something (e.g., playback of a music track) from the distant past, i.e., the past that is more distant that an the recent past.

In some examples, the difference between recent and distant past is quantified, e.g., the past five years is recent past, and anything beyond five years is distant past. In some examples, a quantified difference between recent and distant past depends on the account, e.g., a user's age associated with an account. For example, for a 60 year old user, recent past includes the past ten years only, whereas for a 15 year old user, recent past includes the past two years only. It should be appreciated that multiple variables or parameters can be used to determine a cutoff between recent and distant past, both generally, i.e., across all accounts, and with respect to individual accounts. For example, the cutoff between recent nostalgia and distant nostalgia can depend at least partially on the earliest media content item playback time stamp available in the historical playback log 32 associates with the account.

In some examples, one or more additional nostalgia levels are assigned to requests for media content selection, the one more additional levels lying between recent nostalgia and distant nostalgia, e.g., intermediate nostalgia is defined as a period of time that predates recent nostalgia by up to but not exceeding an amount of time, e.g., five years.

The time difference between the specified time and the current time (i.e., the time the request for media content selection is made) is used to determine the nostalgia level.

In an example embodiment, a request for media content selection is received (e.g., by natural voice or by text) via the media playback device 102. The text parsing module 26 of the NLP 22 parses the text into an intent component and target of the intent, where the target includes a temporal limitation, identifying the request as one for selection (the intent) of one or more media content items that were consumed in the past (the target). In some examples, the time range module 38 is used to attach a time range to the temporal limitation as described above.

The parsed temporal limitation is then mapped to a position on a nostalgia spectrum, using one or more parameters.

Figure 4:
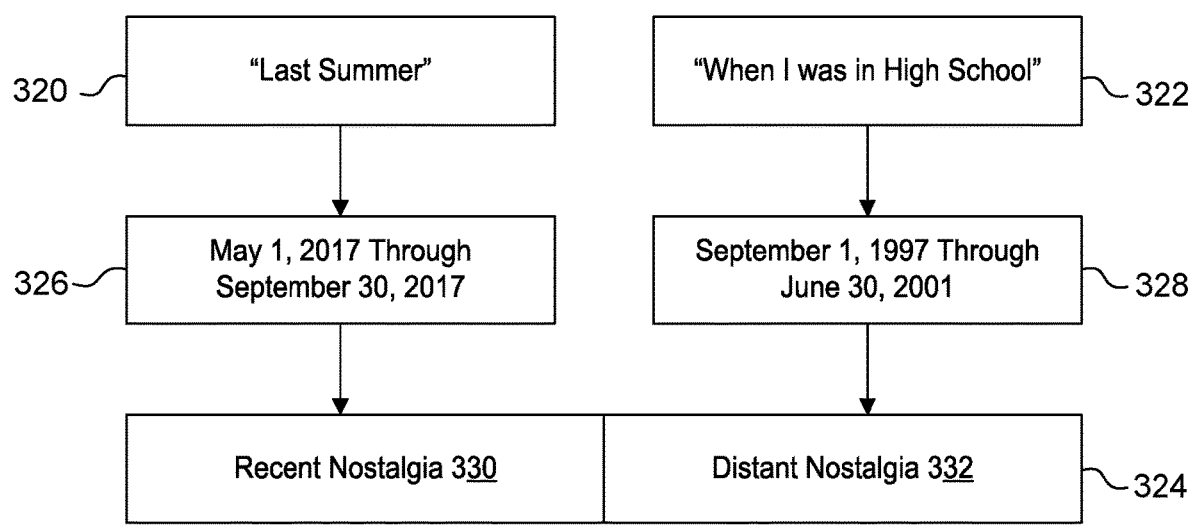
FIG. 4 schematically represents a mapping of temporal limitations in a request for media content selection to a position on a nostalgia spectrum.

A schematic mapping of parsed temporal limitations 320 ("last summer") and 322 ("when I was in high school") to a position on a nostalgia spectrum 324 is depicted in FIG. 4. First, using the time range module 38, the parsed temporal limitation is translated into a translated time 326 ("May 1, 2017 through Sep. 30, 2017") and 328 ("Sep. 1, 1997 through Jun. 30, 2001") prior to the current time or date, e.g., the date of the request. Then, the translated time 326, 328 is mapped to a position, 330 (recent nostalgia) or 332 (distant nostalgia) on the nostalgia spectrum 324.

Figure 3:
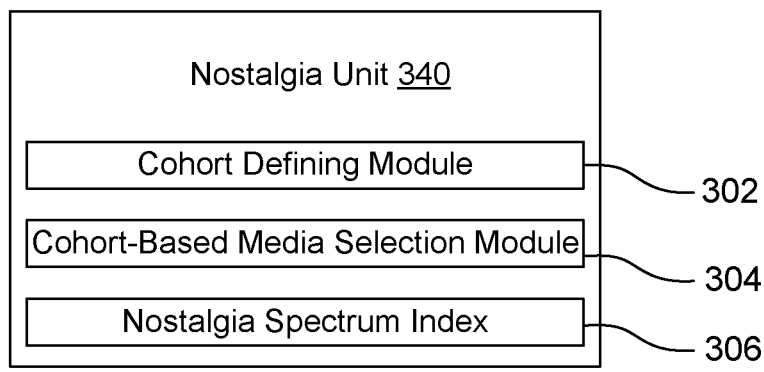
FIG. 3 depicts a nostalgia unit of FIG. 1 according to an example embodiment of the present invention.

Referring to FIG. 3, in some examples, the mapping of parsed temporal limitations to positions on a nostalgia spectrum is performed using a nostalgia spectrum index 306 of the nostalgia unit 340.

Once a nostalgia level is assigned to the request, the nostalgia unit 340 selects one or more media content items to fulfill the request. If the assigned nostalgia level is recent nostalgia, the nostalgia unit 340 fulfills the request by consulting the historical playback log 32 and selecting one or more media content items that meet the temporal limitation, or the temporal limitation as modified by the time range module 38.

If the nostalgia level assigned to the request is something other than recent nostalgia (e.g., distant nostalgia), then the cohort defining module 302 of the nostalgia unit 340 defines a cohort of accounts for inferring one or more media content items to select to fulfill the request.

A cohort is a group of accounts sharing one or more common characteristics, particularly common characteristics with respect to time (e.g., users of the accounts have similar ages, graduated from high school or college at similar times, and so forth). A cohort-level analysis performed by the cohort defining module 302 and the cohort-based media selection module 304 can include identifying a cohort based on demographic information associated with the account, which information can be located in the user accounts 240 (FIG. 1).

The cohort-level analysis performed by the cohort defining module 302 and the cohort-based media selection module 304 can also include calculation of nostalgia metrics associated with the requesting account. In particular, the cohort defining module 302 defines the appropriate cohort by, in part, comparing the requestor account's overall affinity for nostalgia according to one or more nostalgia metrics. The cohort is then defined based in part on the requestor account's affinity for nostalgia, e.g., as a parameter in addition to demographic information. For example, for an account that has relatively low affinity for nostalgia, a cohort is assigned that also has relatively low affinity for nostalgia based on one or more nostalgia metrics.

Once the cohort is defined by the cohort defining module 302, the cohort-based media selection module 304 identifies a first group of inferred media content items due to their relatively high playback rate among members of the assigned cohort and their temporal connection to the temporal limitation of the request. For instance, identifying the first group of inferred media content items can include determining a plurality of media content items that were popular among the defined cohort at a time that meets the temporal limitation, or media content items that are popular now among the defined cohort that were released at or near a time that meets the temporal limitation. Popularity can be calculated by, e.g., summing the total number of consumption events across the entire defined cohort for a given media content item.

In some examples, the nostalgia unit 340 then curates the first group of media content items based on a taste profile 242 (FIG. 1) of the requestor account to form a second, curated group of inferred media content items, the second group being a subset of the first group. The curating can be performed in a manner that is consistent with the description of the curation described above in connection with the system 100 of FIG. 1.

Once the curated group of inferred media content items is identified, one or more a media content items from the curated set is selected by the nostalgia unit 340 to fulfill the request. If no curation is performed, one or more media content items from the first non-curated group of inferred media content items is selected by the nostalgia unit 340 to fulfill the request.

Figure 5:
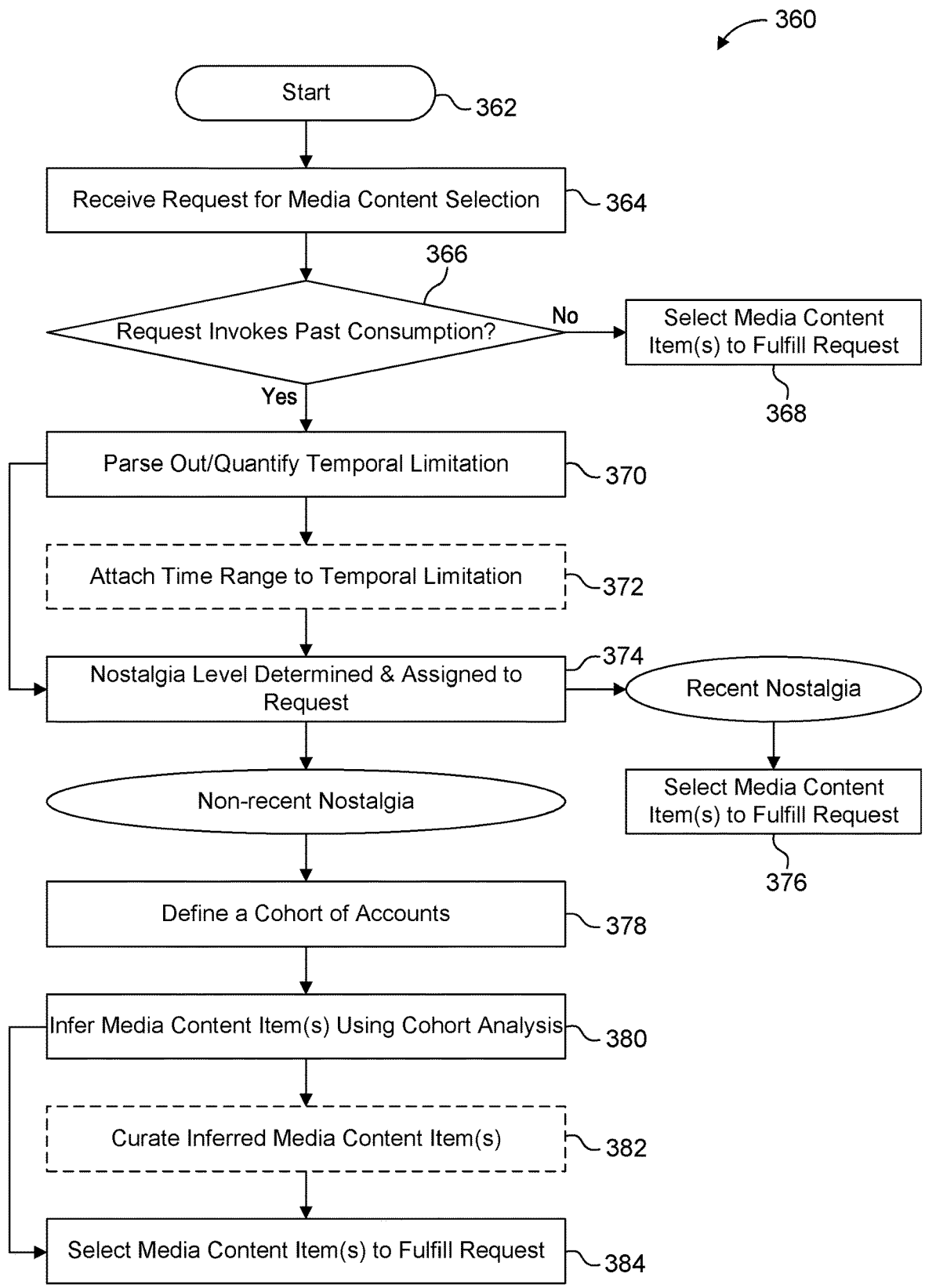
FIG. 5 depicts a process flow according to an example embodiment of the present invention.

FIG. 5 depicts a process flow 360 according to an example embodiment of the present invention. In some examples process flow 360 is performed by system 100 of FIG. 1, including the nostalgia unit 340.

Referring to FIG. 5, the process flow begins, e.g., with an account login, at the start 362.

In an operation 364, a request associated with the account for media content selection is received.

In an operation 366, a determination is made whether the received request invokes a past media content consumption event, e.g., requests selection of media content that was previously consumed by a user of the account.

If it is determined that there is no such invocation in the request, in an operation 368 one or more media content items is/are selected to fulfill the request. If it is determined that there is such an invocation in the request, in an operation 370 the request is parsed to identify a temporal limitation in the request and quantify the temporal limitation.

In an optional operation 372, time range is attached to the parsed out and quantified temporal limitation.

From the operation 370 or from the operation 372 the process flow continues to an operation 374 where a nostalgia level of the temporal limitation is determined. The nostalgia level is assigned to the request.

If the assigned nostalgia level is recent nostalgia, then in an operation 376 one or more media content items from the historical playback log whose timestamps meet the temporal limitation is/are selected to fulfill the request.

If the assigned nostalgia level is something other than recent nostalgia (e.g., distant nostalgia), in an operation 378 a cohort of accounts associated with the requestor account is defined.

Following an operation 378, in an operation 380 one or more media content items are inferred to form a first group of inferred media content items based on past media content consumption of the cohort that meets the temporal limitation.

In an optional operation 382, the first group of inferred media content items is curated, e.g., using a taste profile, to provide a second group of inferred media content items that is a subset of the first group of inferred media content items. In follow-on operation 384, which optionally follows directly from the operation 378, one or more media content items from the second group of inferred media content items (or from the first group of media content items if the operation 382 is skipped) is selected to fulfill the request, e.g., selected for playback on a user device.

Figure 6:
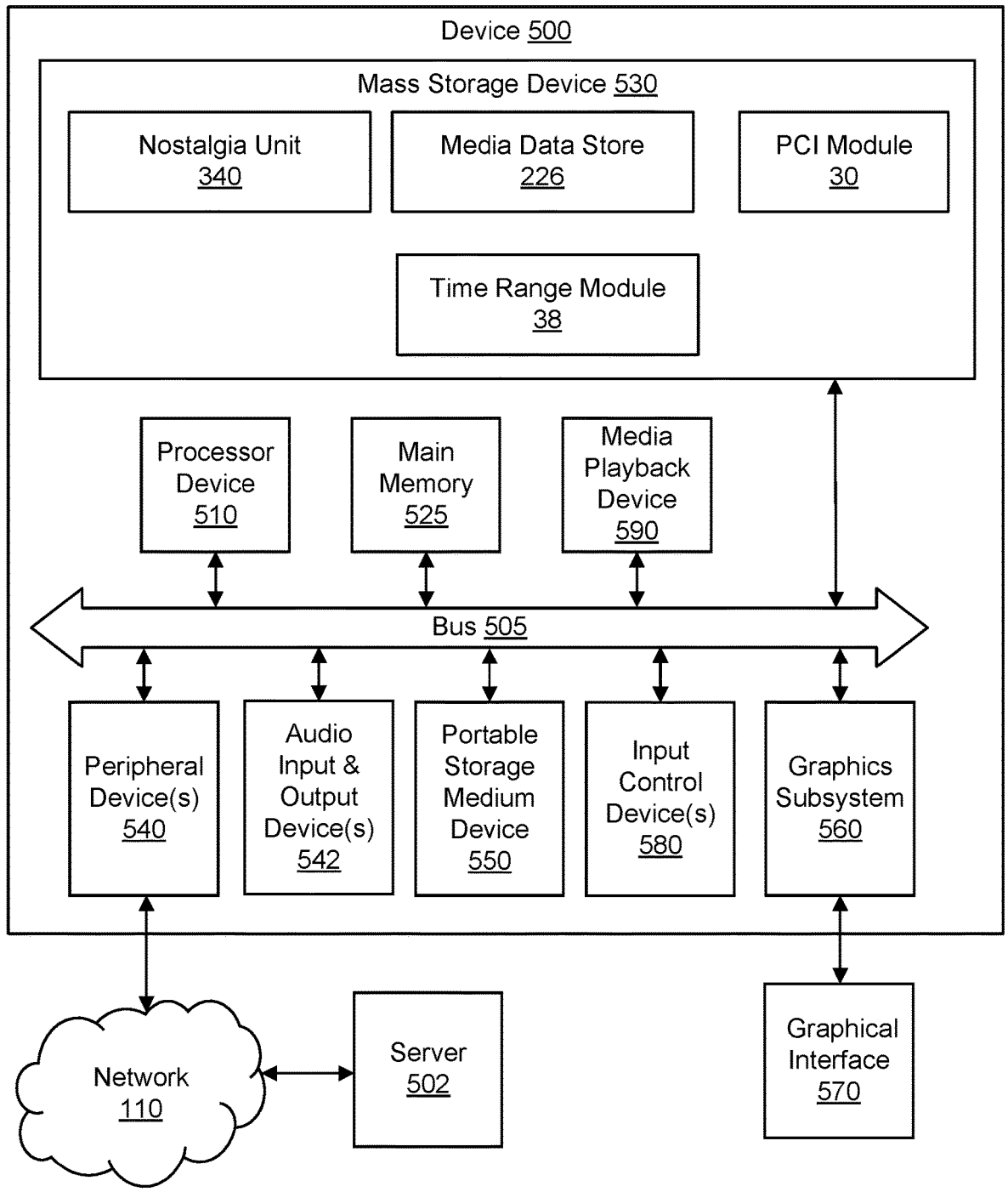
FIG. 6 is a block diagram showing an exemplary device constructed to realize one or more aspects of the example embodiments described herein.

FIG. 6 is a block diagram showing an exemplary device 500 constructed to realize one or more aspects of the example embodiments described herein. In some examples, the device 500 corresponds to the user device 102. In these examples, the device 102 may be connected over the network 110 to one or more servers 502 or other remote devices. The one or more servers 502 can include one or more components described below in relation to the device 500, including a mass storage device and a processor device. That is, various operations and processes described herein can be performed by the cooperation of two or more devices, systems, processes, or combinations thereof. Such a division of operations provides for efficient use of computing resources because servers are generally more powerful than the user device 102.

In other examples, the device 500 is at least partially remote from the user device 102 and linkable to the user device 102 via the network 110; thus, all or portions of the device 500 correspond, in some examples, to components of one or more servers remotely accessible by the user device 102. For example, the device 500 includes one or more of the components of the system 100, other than the user device 102.

The device 500 includes a processing device 510, which can correspond to the one or more processors described above. Also included are a main memory 525 and an interconnect bus 505. The processor device 510 may include without limitation a single microprocessor, or may include a plurality of microprocessors for configuring the device 500 for providing the functionalities described herein. The main memory 525 stores, among other things, instructions and/or data for execution by the processor device 510. The main memory 525 may include banks of dynamic random access memory (DRAM), as well as cache memory.

The device 500 may further include a mass storage device 530, peripheral device(s) 540, audio input device(s) 542 (e.g., a microphone), portable non-transitory storage medium device(s) 550, input control device(s) 580, a media playback device 590 (e.g., a speaker), a graphics subsystem 560, and/or an output interactive graphical interface 570. For explanatory purposes, all components in the device 500 are shown in FIG. 6 as being coupled via the bus 505. However, the device 500 is not so limited. Elements of the device 500 may be coupled via one or more data transport means. For example, the processor device 510, and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 can also store the items themselves, e.g., the nostalgia unit 340, the media data store 226, the PCI module 30, the time range module 38, etc. The mass storage device 530 may be implemented, for example, with a magnetic disk drive or an optical disk drive. In a software embodiment, the mass storage device 530 is configured for loading contents of the mass storage device 530 into the main memory 525. Memory may be embodied as one or more of mass storage device 530, main memory 525, or portable storage medium device 550.

The mass storage device 530 may also include software that, when executed, causes the device 500 to perform the features described above, including but not limited to the functions of the PCI module 30, the NLP 22, the time range module 38, and the nostalgia unit 340.

The portable storage medium device 550 operates in conjunction with a nonvolatile portable storage medium, such as, for example, a solid state drive (SSD), to input and output data and code to and from the device 500. In some embodiments, the software for storing information may be stored on a portable storage medium, and may be inputted into the device 500 via the portable storage medium device 550. The peripheral device(s) 540 may include any type of computer support device, such as, for example, an input/output (I/O) interface configured to add additional functionality to the device 500. For example, the peripheral device(s) 540 may include a network interface card for interfacing the device 500 with a network 110. The audio input devices 542 may be one or more devices configured to receive or obtain audio and provide a representation of the audio (e.g., as an audio clip or file) as output. Thus, the audio input device(s) 542 may include one or more microphones or other devices.

The input control device(s) 580 provide a portion of an interface for the device 500. The input control device(s) 580 may include a keypad and/or a cursor control and/or a touch screen. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 500 may include the graphics subsystem 560 and the graphical interface 570. The graphical interface 570 may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 560 receives textual and graphical information, and processes the information for output to the output display of the interactive graphical interface 570.

Input control devices 580 can control the operation and various functions of device 500. Input control devices 580 can include any components, circuitry, or logic operative to drive the functionality of device 500. For example, input control device(s) 580 can include one or more processors acting under the control of an application.

Each component of the device 500 may represent a broad category of a computer component of a general and/or special purpose computer. Components of the device 500 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, engine, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A non-transitory computer-readable medium having stored thereon instructions that, when executed by one or more processors, cause the one or more processors to:
    receive a request for playback of one or more media content items previously played, the request including a temporal limitation, the request being associated with an account;
    access a playback log of the account;
    determine whether the playback log includes one or more playback entries having timestamps that meet the temporal limitation;
    responsive to the playback log having one or more timestamps that meet the temporal limitation and identifying a playback of one or more media content items that occurred during a time corresponding to the temporal limitation:
        identify one or more first media content items from the playback log based on the temporal limitation; and
        initiate playback of, or perform another selecting action on, the one or more identified first media content items; and
    responsive to the playback log not having one or more timestamps that meet the temporal limitation and identifying no playback of one or more media content items that occurred during a time corresponding to the temporal limitation:
        access a taste profile of the account;
        identify one or more second media content items based on the temporal limitation;
        curate the one or more identified second media content items using at least the taste profile to form a curated set of the one or more second media content items; and
        initiate playback of at least one of the one or more second media content items from the curated set.

2. The non-transitory computer-readable medium of claim 1 having stored thereon further instructions that, when executed by the one or more processors, cause the one or more processors to parse the received request into a historical playback component and the temporal limitation.

3. The non-transitory computer-readable medium of claim 1 having stored thereon further instructions that cause the one or more processors to:
infer a range of time from the temporal limitation; and
identify the one or more second media content items based in part on the inferred range of time.

4. The non-transitory computer-readable medium of claim 3 having stored thereon further instructions that cause the one or more processors to:
expand the inferred range of time and identify the one or more second media content items based in part on the expanded inferred range of time.

5. The non-transitory computer-readable medium of claim 1, wherein the curate includes one or more of:
applying artist limitations to the one or more identified second media content items;
applying album limitations to the one or more identified second media content items;
applying a crowding limitation to the one or more identified second media content items;
removing one or more spam media content items from the one or more identified second media content items;
removing one or more karaoke media content items from the one or more identified second media content items;
removing one or more white noise tracks from the one or more identified second media content items;
removing one or more explicit media content items from the one or more identified second media content items;
collapsing two or more media content item versions from the one or more identified second media content items; and
sorting two or more media content items based on affinity.

6. The non-transitory computer readable medium of claim 1,
wherein the request for playback is received via a voice input device; and
wherein the instructions, when executed by the one or more processors, cause the one or more processors to perform natural language understanding of the request for playback to identify the temporal limitation.

7. The non-transitory computer readable medium of claim 1, wherein the request for playback is received via a manual input device.

8. A computer implemented method, comprising:
receiving a request for playback of one or more media content items previously played, the request including a temporal limitation, the request being associated with an account;
accessing a playback log of the account;
determining whether the playback log includes one or more playback entries having timestamps that meet the temporal limitation;
responsive to the playback log having one or more timestamps that meet the temporal limitation and identifying a playback of one or more media content items that occurred during a time corresponding to the temporal limitation:
identifying one or more first media content items from the playback log based on the temporal limitation; and
initiating playback of, or performing another selecting action on, the one or more identified first media content items; and responsive to the playback log not having one or more timestamps that meet the temporal limitation and identifying no playback of one or more media content items that occurred during a time corresponding to the temporal limitation:
accessing a taste profile of the account;
identifying one or more second media content items based on the temporal limitation;
curating the one or more identified second media content items using at least the taste profile to form a curated set of the one or more second media content items; and
initiating playback of at least one of the one or more second media content items from the curated set.

9. The method of claim 8, further comprising:
parsing the received request into a historical playback component and the temporal limitation.

10. The method of claim 8, further comprising:
inferring a range of time from the temporal limitation; and
identifying the one or more second media content items based in part on the inferred range of time.

11. The method of claim 10, further comprising:
expanding the inferred range of time and identifying the one or more second media content items based in part on the expanded inferred range of time.

12. The method of claim 8, wherein curating includes one or more of:
applying artist limitations to the one or more identified second media content items;
applying album limitations to the one or more identified second media content items;
applying a crowding limitation to the one or more identified second media content items;
removing one or more spam media content items from the one or more identified second media content items;
removing one or more karaoke media content items from the one or more identified second media content items;
removing one or more white noise tracks from the one or more identified second media content items;
removing one or more explicit media content items from the one or more identified second media content items;
collapsing two or more media content item versions from the one or more identified second media content items; and
sorting two or more media content items based on affinity.

13. The method of claim 8,
wherein the request for playback is received via a voice input device, the method further comprising:
performing natural language understanding of the request for playback to identify the temporal limitation.

14. The method of claim 8, wherein the request for playback is received via a manual input device.

15. A system, comprising:
one or more processors; and
a non-transitory computer-readable medium having stored thereon instructions that, when executed by the one or more processors, cause the one or more processors to:
receive a request for playback of one or more media content items previously played, the request including a temporal limitation, the request being associated with an account;
access a playback log of the account;
determine whether the playback log includes one or more playback entries having timestamps that meet the temporal limitation;

responsive to the playback log having one or more timestamps that meet the temporal limitation and identifying a playback of one or more media content items that occurred during a time corresponding to the temporal limitation:
  identify one or more first media content items from the playback log based on the temporal limitation; and
  initiate playback of, or perform another selecting action on, the one or more identified first media content items; and
responsive to the playback log not having one or more timestamps that meet the temporal limitation and identifying no playback of one or more media content items that occurred during a time corresponding to the temporal limitation:
  access a taste profile of the account;
  identify one or more second media content items based on the temporal limitation;
  curate the one or more identified second media content items using at least the taste profile to form a curated set of the one or more second media content items; and
  initiate playback of at least one of the one or more second media content items from the curated set.

16. The system of claim 15, wherein the non-transitory computer-readable medium has stored thereon instructions that, when executed by the one or more processors, cause the one or more processors to: parse the received request into a historical playback component and the temporal limitation.

17. The system of claim 15, wherein the non-transitory computer-readable medium has stored thereon instructions that, when executed by the one or more processors, cause the one or more processors to:
  infer a range of time from the temporal limitation; and
  identify the one or more second media content items based in part on the inferred range of time.

18. The system of claim 17, wherein the non-transitory computer-readable medium has stored thereon instructions that, when executed by the one or more processors, cause the one or more processors to: expand the inferred range of time and identify the one or more second media content items based in part on the expanded inferred range of time.

19. The system of claim 15, wherein the curate includes one or more of:
  applying artist limitations to the one or more identified second media content items;
  applying album limitations to the one or more identified second media content items;
  applying a crowding limitation to the one or more identified second media content items;
  removing one or more spam media content items from the one or more identified second media content items;
  removing one or more karaoke media content items from the one or more identified second media content items;
  removing one or more white noise tracks from the one or more identified second media content items;
  removing one or more explicit media content items from the one or more identified second media content items;
  collapsing two or more media content item versions from the one or more identified second media content items; and
  sorting two or more media content items based on affinity.

20. The system of claim 15, wherein the request for playback is received via a voice input device; and
  wherein the non-transitory computer-readable medium has stored thereon instructions that, when executed by the one or more processors, cause the one or more processors to: perform natural language understanding of the request for playback to identify the temporal limitation.

21. The system of claim 15, wherein the request for playback is received via a manual input device.

* * * * *